March 15, 1955 T. F. MARKER 2,704,330
VOLTAGE STABILIZED OSCILLATOR
Filed Jan. 14, 1954

*INVENTOR.*
THOMAS F. MARKER
*BY*
Roland A. Anderson
ATTORNEY

United States Patent Office 2,704,330

Patented Mar. 15, 1955

2,704,330

VOLTAGE STABILIZED OSCILLATOR

Thomas F. Marker, Sandia Base, Albuquerque, N. Mex., assignor, by mesne assignments, to the United States of America as represented by the United States Atomic Energy Commission Application January 14, 1954, Serial No. 404,150

3 Claims. (Cl. 250—36)

This invention relates to a voltage stabilizer and more particularly to semiconducting rectifiers connected in a manner to stabilize the voltage in electrical circuits.

The prior art has made use of several types of regulators in achieving voltage stabilization. There is the lamp-type thermistor comprising a tungsten filament, which increases its resistance to an electrical current with increase in temperature. This type of conductor has been employed as a low impedance device and requires a considerable amount of power. There is also a class of materials known as semiconductors. These are composed of various substances such as copper oxide, selenium, germanium, and silicon. All of these semiconductors have the characteristic that they offer less resistance to the passage of current in one direction than in the other. Also, with sufficient thermal excitation both the forward and back resistances decrease. It is this negative resistance property of semiconductors that is of fundamental importance in the present invention.

Prior to this invention, semiconducting diode rectifiers have been used in pairs to provide voltage stabilization, but the arrangement has been a parallel reverse connection, as contrasted to the series reverse connection of the diodes in the present invention. The parallel arrangement of the diodes can be employed satisfactorily with a low impedance source of potential, but essentially short-circuits a high impedance source.

It is therefore an object of the present invention to provide a means of voltage stabilization which will operate successfully with a high impedance potential source.

It is a further object of this invention to achieve voltage stabilization in oscillators and amplifiers, with a relatively small expenditure of power.

It is still another object of this invention to provide voltage amplitude stabilization in oscillators and amplifiers employing tubes having various characteristics.

Other objects and advantages of the present invention will become apparent to persons skilled in the art from the following description of the presently preferred embodiment taken in connection with the drawings made a part of this specification.

In all figures, like numerals designate like elements.

Figure 1:
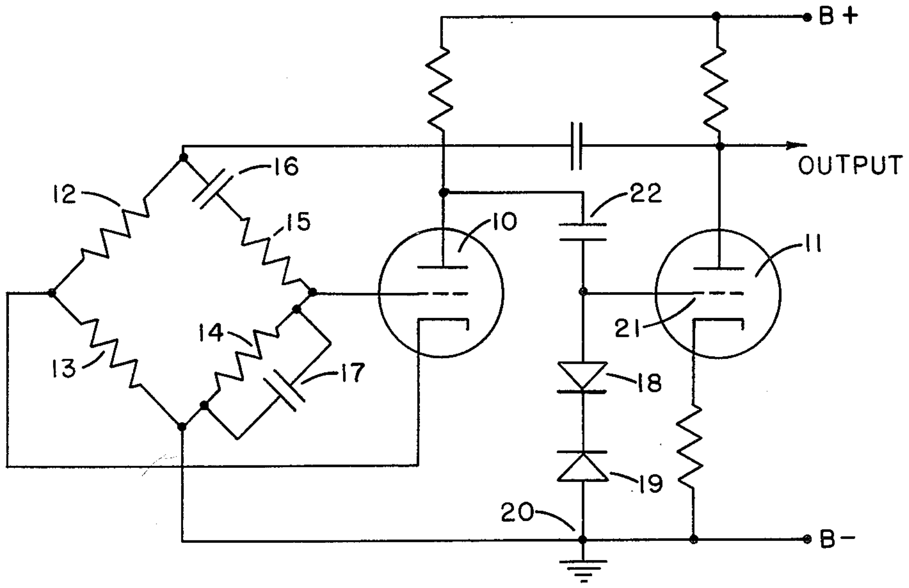
Fig. 1 is a circuit diagram of a Wien bridge oscillator incorporating two semiconducting diodes in the grid circuit of an inverter vacuum tube.

Referring now to Fig. 1, there is shown a conventional Wien bridge oscillator circuit having an amplifying tube 10, an inverter tube 11 and a bridge circuit composed of resistors 12, 13, 14, and 15 and capacitors 16, 17. Two similar germanium diode rectifiers 18 and 19 in series opposition to each other are connected between a ground conductor 20 and the control grid 21 of inverter tube 11.

A signal appearing at the plate of amplifier tube 10 is transmitted through condenser 22 to the control grid 21 of inverter tube 11. The output voltage of tube 11 is in phase with the initial signal on the control grid of tube 10, thus providing the regenerative feedback necessary to cause oscillations to be set up and maintained.

The bridge circuit composed of resistors 12, 13, 14, 15 and capacitors 16 and 17 is used to eliminate feedback voltages of all frequencies except the single frequency desired in the input of tube 10. Oscillation can take place only at frequency $$f_0=\frac{1}{2\pi CR}$$

where CR refers to the product of resistance 15 and capacitor 16, or resistance 14 and capacitor 17. Furthermore, resistance 12 must equal twice resistance 13, and resistance 14 must equal resistance 15.

The like diode rectifiers 18 and 19 have the characteristic that in the forward or conducting direction current may flow freely and resistance is very low while in the reverse or semiconducting direction current may flow less freely and the back resistance is relatively very high. Since the two diodes are oriented in opposite directions, it follows that the impedance offered to an alternating current becomes equal on both half cycles.

If the output voltage of tube 10 should increase, due to change in tube condition, heating of circuit elements, or other reason, there will be a resultant increase in current flow between control grid 21 and ground conductor 20. This increased current flow will cause the temperature of diodes 18 and 19 to increase. However, these diodes, in addition to their other properties, have a high negative temperature coefficient of resistance. Therefore the increased current flow will be accompanied by a correspondingly decreased impedance between control grid 21 and ground conductor 20. Thus the potential difference between these two points will be stabilized and the output voltage of tube 11 maintained at a substantially constant level.

The thermal time constant of the diodes 18 and 19 is sufficiently long that when employed in oscillators at frequencies about 100 cycles there is no appreciable change in temperature during any one cycle. Therefore, there is no significant distortion of the sine wave.

Figure 2:
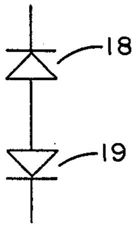
Fig. 2 is a circuit diagram illustrating the grid-to-ground connections of the inverter tube of Fig. 1 with the polarity of the semiconducting diodes reversed.

In Fig. 2 diodes 18 and 19 are shown again in series opposition but the polarity of each diode has been reversed. This orientation will produce a result identical with that described above.

Figure 3:
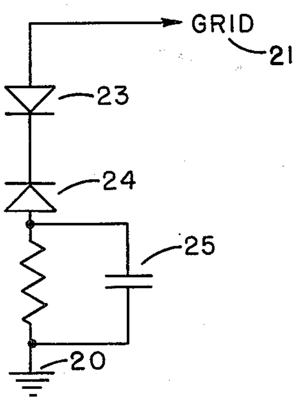
Fig. 3 is a circuit diagram of the grid-to-ground connections of the inverter tube of Fig. 1 with an RC network connected in series with the pair of semiconducting diodes.

Fig. 3 shows a further variation of this invention which also provides very effective voltage regulation. For this variation tube 11 must be a type whose control grid has a supercontrol characteristic such that cut-off bias is not sharply defined but occurs rather gradually. Also, diodes 23 and 24 are selected so that their characteristics are not the same with respect to back resistance.

The pair of unbalanced crystals are connected so that an increase in signal appearing at control grid 21 of tube 11 will produce an increase of negative potential at control grid 21 with respect to ground conductor 20, because of the charge which accumulates on capacitor 25. It may be shown that this increase of negative charge increases the negative grid bias on tube 11 and further improves the regulatory effect of the series opposed diodes 23 and 24.

It will be seen that what is described is a simple and reliable method of voltage stabilization in an electrical oscillating circuit. The series connection of the diodes for voltage stabilization is not limited to the embodiment herein shown and described. Many variations in the arrangement of the system or in the circuit described will now be apparent to one skilled in the art without departing from the scope of the invention as defined in the appended claims.

What is claimed is:

1. An electrical circuit comprising an amplifying vacuum tube having at least a cathode, an anode and a control grid having supercontrol characteristics, a source of alternating voltage, means for stabilizing said voltage between the control grid and the cathode comprising a pair of semiconducting diodes having dissimilar back resistance characteristics connected in series opposition to each other and in series with an RC network, said semiconducting diodes and RC network being connected between the control grid and the cathode of the vacuum tube.

2. An electrical system comprising an amplifying vacuum tube having at least a cathode, an anode and a control grid having super-control characteristics, a source of direct current potential, positive feedback means including a frequency-determining circuit between the anode and the control grid and means for stabilizing the amplitude of said oscillations comprising a pair of semiconducting diodes having dissimilar back resistance characteristics connected in series opposition to each other and in series with an RC network, said semiconducting diodes and RC network being connected between the control grid and cathode of the vacuum tube.

3. An electrical oscillating circuit comprising a first and second vacuum tube, each of said tubes having at least a cathode, an anode and a control grid, the control grid of the first tube having supercontrol characteristics, a Wien bridge of which the battery diagonal includes the first tube and the galvanometer diagonal includes the second tube, the anode of the second tube being capacitatively coupled to the control grid of the first tube, and means for stabilizing the amplitude of the generated oscillating voltage comprising a pair of semiconducting diodes having dissimilar back resistance characteristics connected in series opposition to each other and in series with an RC network, said semiconducting diodes and RC network being connected between the control grid and cathode of the first vacuum tube.

References Cited in the file of this patent

UNITED STATES PATENTS 2,598,929 Moore ---------------- June 3, 1952

FOREIGN PATENTS 426,396 Great Britain ---------- Mar. 28, 1935

OTHER REFERENCES

"Theory of Amplitude Stabilized Oscillators," by Agrain et al., Proc. of IRE for January 1948, pages 16 to 19.